J. C. PINTO.
ADJUSTABLE SUPPORT FOR MOTOR CYCLES AND THE LIKE.
APPLICATION FILED NOV. 3, 1914.
1,143,780. Patented June 22, 1915.
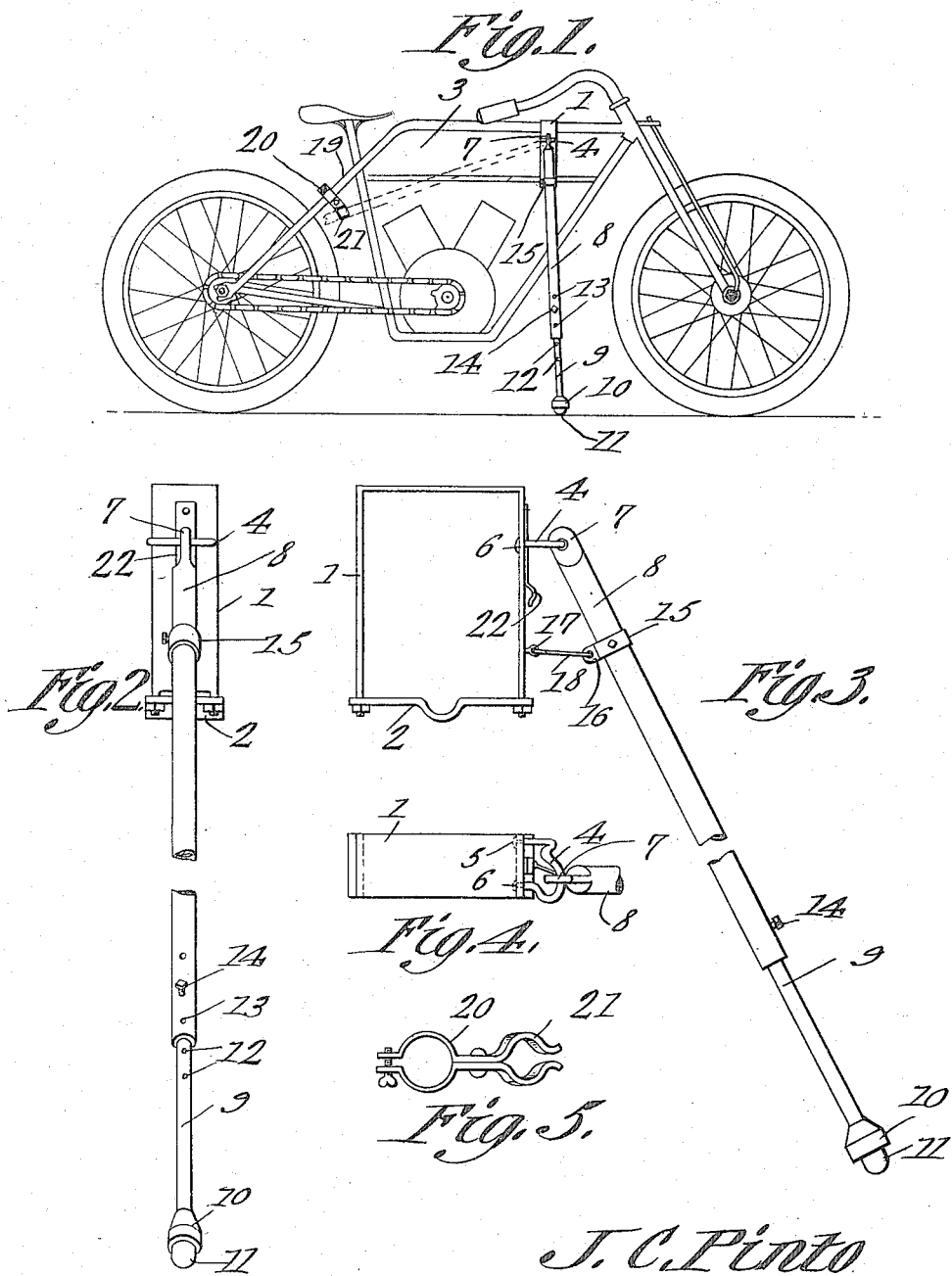

UNITED STATES PATENT OFFICE.

JACOB C. PINTO, OF SAN JOSE, CALIFORNIA, ASSIGNOR OF ONE-HALF TO HARRY GILMOUR, OF SAN JOSE, CALIFORNIA.

ADJUSTABLE SUPPORT FOR MOTOR-CYCLES AND THE LIKE.

1,143,780. Specification of Letters Patent. Patented June 22, 1915.

Application filed November 3, 1914. Serial No. 870,098.

*To all whom it may concern:*

Be it known that I, JACOB C. PINTO, a citizen of the United States, residing at San Jose, in the county of Santa Clara and State of California, have invented a new and useful Adjustable Support for Motor-Cycles and the like, of which the following is a specification.

The present invention relates to improvements in an adjustable support for motor cycles and the like, one object of the invention, being the provision of a neat and easily manipulated support, adapted to be connected to a motor cycle, bicycle or the like, to be readily swung into and out of position for engaging the ground to maintain the motor cycle in an inclined or upright position as desired.

A further object of the present invention, is the provision of a device of this character, the parts of which are readily attached to any form of motor cycle or bicycle and which when the same is in use, will extend at an angle from the article to be supported to engage the ground and thus hold the motor cycle or bicycle in the desired inclination, and when not in use is readily disposed adjacent to the frame thereof so to be out of the way of the rider.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of a motor cycle showing the support in use. Fig. 2 is a view in elevation of the support, the tubular member thereof being broken away. Fig. 3 is a side elevation thereof, the same being held in supporting position. Fig. 4 is a top plan view of the upper end of the support and the attaching member thereof. Fig. 5 is a top plan view of the frame carried clip for maintaining the support in out of use position.

Referring to the drawings, the numeral 1 designates a U-shaped frame or gripping member which is adapted to be inverted so that the plate 2 which constitutes therewith a clamping member is upon the lower end thereof and thus surrounds the gasolene tank 3 of the motor cycle. This supporting member composed of the parts 1 and 2 is merely indicative of a convenient means by which the present device may be attached to a motor cycle or bicycle, and as most motor cycles are provided with the gasolene tank 3 at the point indicated, it is preferable that the supporting member be attached thereabout.

The peculiar shaped bail 4 which may be cast or made of bent wire, is provided with the riveted terminals 5 and 6, attached to one leg of the member 1, the member 4 constituting a connection with the apertured leg or end 7 of the tubular member 8 of the support. By this means, the support may be readily swung to the full or dotted line position as shown in Fig. 1.

Mounted slidably or telescopically within the tubular member 8 so as to render the support adjustable, is a solid rod 9, which carries upon its lower end, the enlarged socketed member 10 for the reception of the rubber ground engaging member 11. The rod 9 is provided with a plurality of diametrically disposed openings 12 therethrough, while the tubular member 8 is provided with similar openings 13, so that the screw or holding member 14 may be disposed through the registered openings 13 and 12 respectively, so that the members 8 and 9 may be clamped in any desired adjusted position according to the height of the motor cycle or bicycle upon which the device is used.

In order to provide a means for locking the supporting member composed of the parts 8 and 9 against spreading movement when the same is in the position as shown in Figs. 1 and 3, the clip 15 is attached to the tubular member 8 and has disposed in the apertured lug 16, the hook 18, said hook 18 being attached at 17 to the clamping member 1. This hook may be interchanged and be carried by the part 17 or by the part 16 as may be found desirable.

In order to provide a means for holding the support in dotted line position as shown in Fig. 1, when the motor cycle is being ridden, thus placing the members 8 and 9 out of the way of the rider, the clip 20 is attached to the frame 19 and is provided with the spring clip 21 in which the rod 9 of the lower end of the tubular member 8 may be inserted and thus be frictionally held in the support in the dotted line position as shown.

It will be noted that by making the member 8 as shown in Fig. 4, the apertured portion 7 thereof may be caused to assume any desired adjustment or angularity with the member 4 as the center, thus permitting the supporting member composed of the parts 8 and 9 to be disposed farther toward the front or the rear wheel of the motor cycle, as desired, thus permitting ready access to the parts of the machine, the fastening device 18 holding the parts in the desired supporting position regardless of this peculiar angularity. Where the hook 18 is carried by the member 17 it is desirable that the same be prevented from swinging, and for this purpose, a clip 22 is attached to the terminal of the member 1 in the path to engage the free end of the hook 18 and thus hold it against movement.

What is claimed is:

1. A support for motor cycles and the like, including a frame, a bail connected to one side of the frame and disposed transversely thereof, an extensible member having an apertured end swingingly connected to said bail, and coöperative means carried by the frame and extensible member for holding the said member against spreading movement when in supporting position.

2. A support for motor cycles and the like, including a clamping frame, a figure 3 shaped bail having its terminals connected to said frame and having its longitudinal length extending transversely of the frame, an extensible member having its upper end slidably and swingingly mounted upon the bail, and coöperative means carried by the extensible member and the frame for locking the said member relatively to the frame when in supporting position.

3. A support for motor cycles and the like, including a clamping frame, a figure 3 shaped bail having its terminals connected to said frame and having its longitudinal length extending transversely of the frame, and an extensible member having its upper end slidably and swingingly mounted upon the bail.

In testimony that I claim the foregoing as my own, I have hereto affixed my signature in the presence of two witnesses.

JACOB C. PINTO.

Witnesses:
DANIEL T. BIGELOW,
CORNELIUS BIGELOW.

Copies of this patent may be obtained for five cents each, by addressing the "Commissioner of Patents, Washington, D. C."